E. SCHNEIDER.
DOUBLE ACTING FUSE FOR PROJECTILES.
APPLICATION FILED JULY 1, 1915.

1,234,574.

Patented July 24, 1917.

E. SCHNEIDER.
DOUBLE ACTING FUSE FOR PROJECTILES.
APPLICATION FILED JULY 1, 1915.

1,234,574.

Patented July 24, 1917.

Inventor!
Eugène Schneider
by
Mauro, Cameron, Lewis & Massie
Attys.

E. SCHNEIDER.
DOUBLE ACTING FUSE FOR PROJECTILES.
APPLICATION FILED JULY 1, 1915.

1,234,574.

Patented July 24, 1917.
7 SHEETS—SHEET 3.

E. SCHNEIDER.
DOUBLE ACTING FUSE FOR PROJECTILES.
APPLICATION FILED JULY 1, 1915.

1,234,574.

Patented July 24, 1917.
7 SHEETS—SHEET 4.

E. SCHNEIDER.
DOUBLE ACTING FUSE FOR PROJECTILES.
APPLICATION FILED JULY 1, 1915.
1,234,574.
Patented July 24, 1917.
7 SHEETS—SHEET 5.
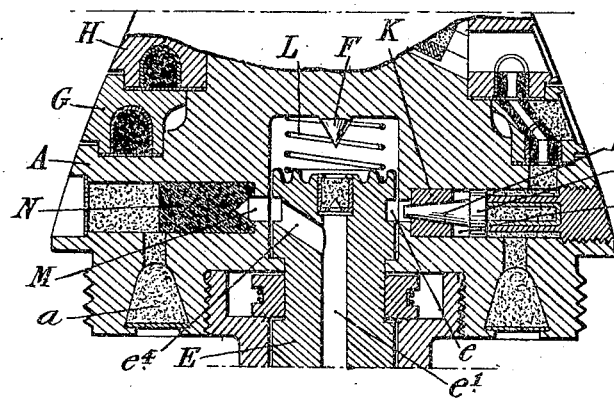
Fig. 12.
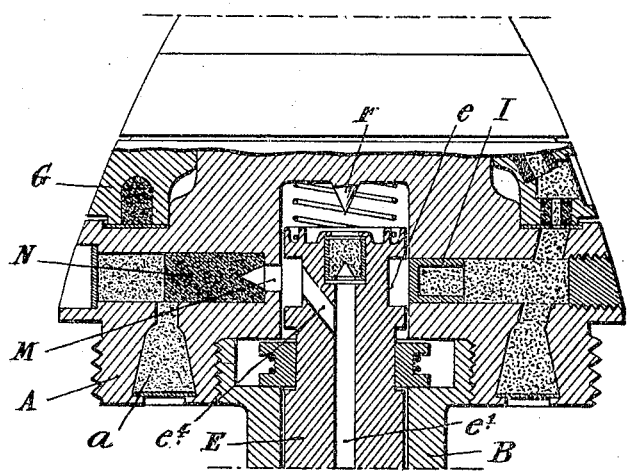
Fig. 13.
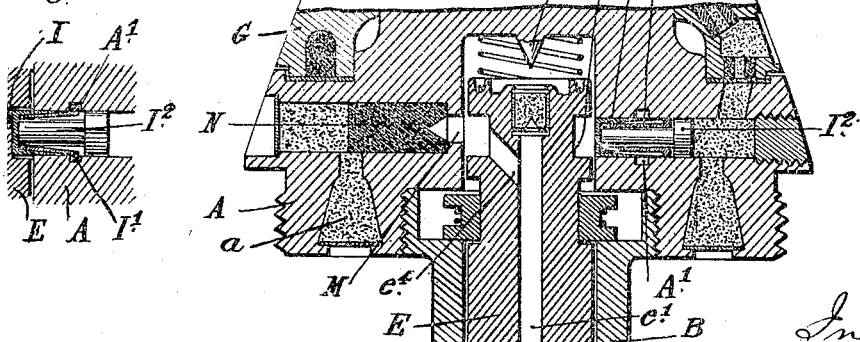
Fig. 15.
Fig. 14.

E. SCHNEIDER.
DOUBLE ACTING FUSE FOR PROJECTILES.
APPLICATION FILED JULY 1, 1915.

1,234,574.

Patented July 24, 1917.
7 SHEETS—SHEET 6.

Inventor:
Eugène Schneider
by
Mauro, Cameron, Lewis & Massie
Attys.

E. SCHNEIDER.
DOUBLE ACTING FUSE FOR PROJECTILES.
APPLICATION FILED JULY 1, 1915.

1,234,574.

Patented July 24, 1917.
7 SHEETS—SHEET 7.

Inventor:
Eugène Schneider
by Mauro Cameron Lewis Chasson
Attys.

UNITED STATES PATENT OFFICE.

EUGÈNE SCHNEIDER, OF PARIS, FRANCE.

DOUBLE-ACTING FUSE FOR PROJECTILES.

1,234,574.  Specification of Letters Patent. Patented July 24, 1917.

Application filed July 1, 1915. Serial No. 37,538.

*To all whom it may concern:*

Be it known that I, EUGÈNE SCHNEIDER, resident of Paris, France, have invented new and useful Improvements in or Relating to Double-Acting Fuses for Projectiles, which is fully set forth in the following specification.

This invention relates to double acting fuses for projectiles which are adapted to act as common shell or shrapnel according to the adjustment of the fuse and which are provided with two firing mechanisms. One mechanism, intended to act in all cases as soon as the projectile is fired, insures the transmission of the flame to the rear charge when the projectile is to act as shrapnel while the second mechanism is intended to act only at the moment at which the projectile falls or makes impact with an obstacle.

When by suitably adjusting the fuse the projectile is set to act as shrapnel it frequently happens that the second firing mechanism (the mechanism of the percussion system) acts prematurely. These premature operations of the percussion system usually take place at the moment at which the shrapnel bursts, whereby the bursting is prejudicially disturbed.

According to this invention the aforesaid defect is avoided by providing the projectile with an arrangement which serves to render impossible the transmission of the flame to the detonator of the common shell part except at a suitable distance from the bursting point of the shrapnel. This result can be obtained:

(*a*). By means of a device which renders the percussion firing mechanism temporarily inoperative by a braking or locking mechanism, the action of which becomes ineffective when the fuse strikes against an obstacle.

(*b*). By a permanent locking device operated by hand or automatically under the influence of the gases of the flame transmitted to the rear charge of the shrapnel.

(*c*). By a screen or other device interposed between the percussion firing mechanism and the detonator the said device being actuated by hand when the fuse is adjusted or automatically under the influence of the gases of the powder transmitting the flame to the rear charge of the shrapnel.

With both the devices defined under (*b*) and (*c*) it is indispensable to insure the destruction of the detonator which is no longer normally insured by the operation of the percussion firing mechanism. This result is obtained by means of a retarded ignition transmission (compressed powder for example) ignited by the flame transmitted to the rear charge and in communication with the detonator through ports in the body of the fuse and the plunger of the percussion striking mechanism.

(*d*). Finally the desired result can be obtained by producing either temporarily or permanently a relative displacement of the striker and the plunger of the percussion firing mechanism in such a manner as to bring the plunger out of range or out of the path of the striker. If this relative displacement is permanent, the device, like those in paragraphs (*b*) and (*c*), will be combined with a retarded ignition transmission insuring the destruction of the detonator at a suitable distance from the bursting point of the shrapnel.

In order that the said invention may be clearly understood and readily carried into effect I will proceed to describe the same more fully with reference to the accompanying drawings, in which:—

Figures 1 to 11 inclusive illustrate constructural examples, in which premature ignition of the detonator is prevented by a device for temporarily braking or locking the percussion firing mechanism; the detonator being normally exploded when the fuse strikes against an obstacle.

Figs. 12 to 16 inclusive illustrate various embodiments of the invention in which a hand or automatic locking device for the percussion mechanism is combined with a retarded flame transmission ignited by the fuse system and insuring the explosion of the detonator at a suitable distance from the bursting point of the shrapnel.

Figure 8:
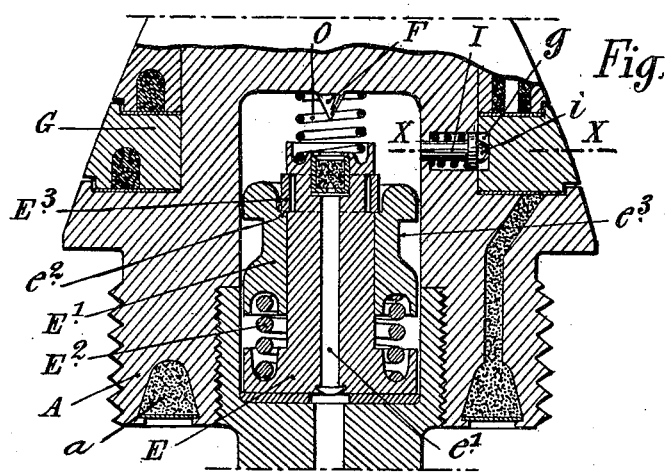
Figure 6:
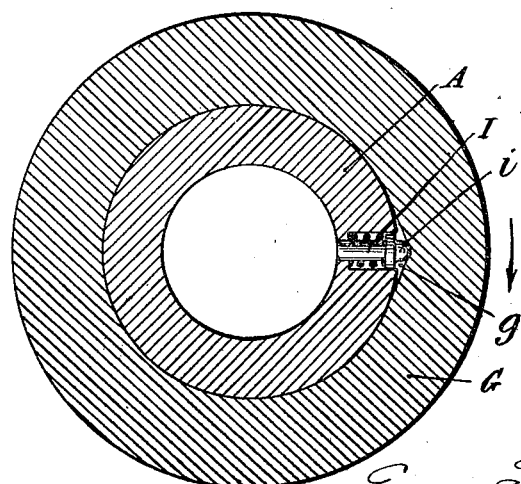
Figure 20:
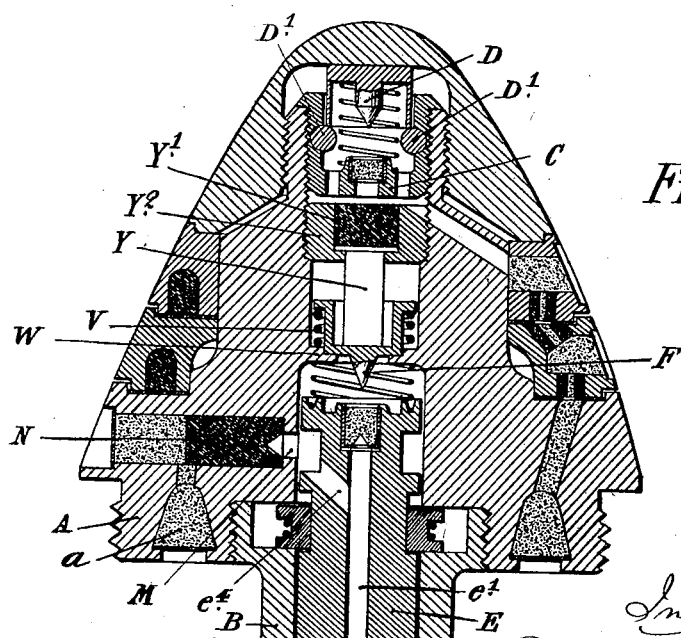

In all the figures, excepting Figs. 6, 8 and 20, the fuse is shown adjusted for the projectile to act as shrapnel.

In all embodiments of the invention the fuse comprises a body A of appropriate construction at the bottom of which the detonator B is screwed or otherwise inserted.

The two usual firing mechanisms C—D and E—F are arranged in the fuse body. C is the priming holder of the time fuse firing mechanism, D is the corresponding pin; E is the plunger of the percussion firing mechanism and F is the corresponding pin.

By suitably regulating the position of the movable fuse ring G relatively to the fixed fuse ring H, the fuse is set for the projectile to act as shrapnel. The operation is insured in the known manner by the mechanism C—D which, acting when the shot is fired, transmits the flame to the rings H, G, to the port $a$ and thence to the rear charge of the projectile.

In order to prevent inopportune operation of the percussion mechanism E—F when the shrapnel charge is ignited the mechanism is provided with a device rendering the same temporarily inoperative, such as a braking or other device.

Figure 1:
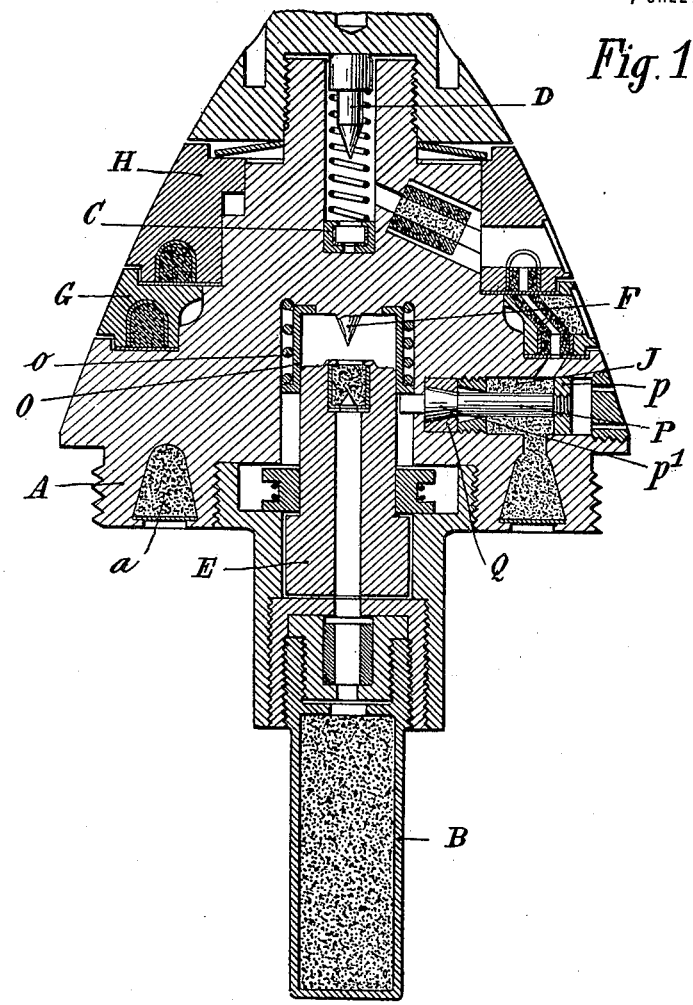

The construction illustrated in Fig. 1 comprises a braking device which automatically becomes operative under the influence of the transmission of the flame to the rear charge.

This device which opposes resistance to the inopportune advance of the plunger E may be constituted by a ring O subjected to the action of a spring $o$. The ring is put out of action by causing it to compress the spring $o$. This is effected by the nose of a bolt P which is provided with a collar $p$ forming a piston and with a frusto-conical protuberance $p'$ engaged in a ring $q$ of lead or other soft metal.

If the projectile is intended to act as common shell on impact the percussion mechanism E—F retains its normal operation that is to say the braking device is locked by the nose of the bolt P.

If, on the other hand, the projectile is intended to act as shrapnel, that is to say, if, as represented in the drawing, the fuse is adjusted for time fuse firing, the flame in its transmission to the rear charge of the shrapnel kindles the charge of powder J. In acting upon the shoulder $p$ the gases from said charge force the bolt outward. The ring O is thereby released and its spring $o$ impels it onto the plunger E. As the bolt remains wedged in the ring of lead Q it cannot resume its initial position. As a result any inopportune movement of the plunger E in the forward direction is prevented by the spring controlled ring O which sufficiently reduces the sensitiveness of the said plunger. The shrapnel is thus able to burst without the operation of the mechanism E—F disturbing the bursting.

When the fuse or nose of the projectile encounters an obstacle, the inertia of the plunger E insures its projection on to the striker F notwithstanding the resistance of the spring $o$.

Figure 2:
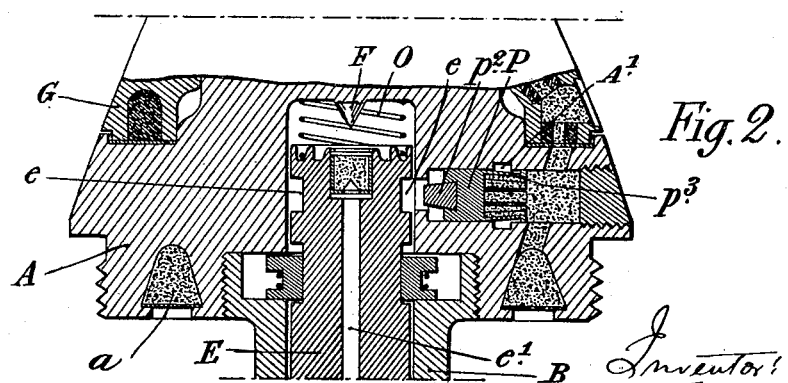

In the modification represented in Fig. 2 the braking device for the plunger E is constituted by a spring O which is adapted to act in conjunction with a bolt P provided with a leaden nose $p^2$ and a tail composed of flexible branches $p^3$.

The nose $p^2$ engages a groove $e$ in the plunger E when the bolt P is subjected to the influence of the gases evolved by the combustion of the charge which transmits the flame toward the rear of the shrapnel, the said bolt being forced inward by said gases. The rear flexible branches $p^3$ of the bolt are spread at the same time and their extremities engage in a groove A' in the body of the fuse so as to prevent the bolt returning to its original position.

When the shrapnel bursts the spring O and the bolt P with the leaden nose $p^2$ retain the plunger E and prevent its projection toward the striker F. When the nose of the projectile strikes an obstacle however, the plunger E shears the leaden nose $p^2$, and compresses the spring O thereby insuring operation of the mechanism E—F for the destruction of the detonator B.

In these two embodiments of the invention the braking device for the plunger of the firing mechanism becomes operative automatically.

Figure 3:
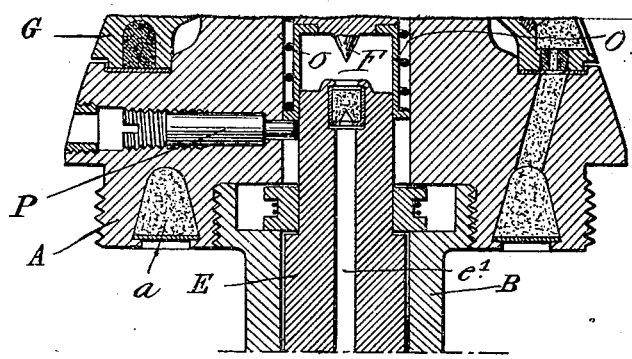

In the fuse illustrated in Fig. 3 the plunger E of the firing mechanism is provided with a spring ring braking device O similar to that employed in Fig. 1 except that the bolt P is adapted to be rendered inoperative by unscrewing it by hand.

The bolt P which serves to retain the braking device, may of course, merely slide and be held by a pin in such a manner that said pin can be removed by hand or automatically sheared or otherwise rendered inoperative under the influence of centrifugal force.

Figure 4:
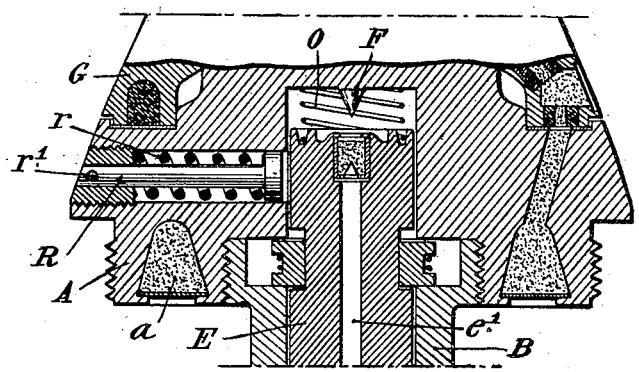

Fig. 4 illustrates a modification in which the braking device for the plunger E is constituted by a spring O combined with a spring friction device R—$r$ which is normally rendered inoperative by a pin $r'$. When the pin $r'$ is withdrawn the head of the frictional device bears upon the outer surface of the plunger E.

Figs. 5 to 8 illustrate an arrangement in which the plunger E of the firing mechanism is divided into two elements E and E'

Figure 5:
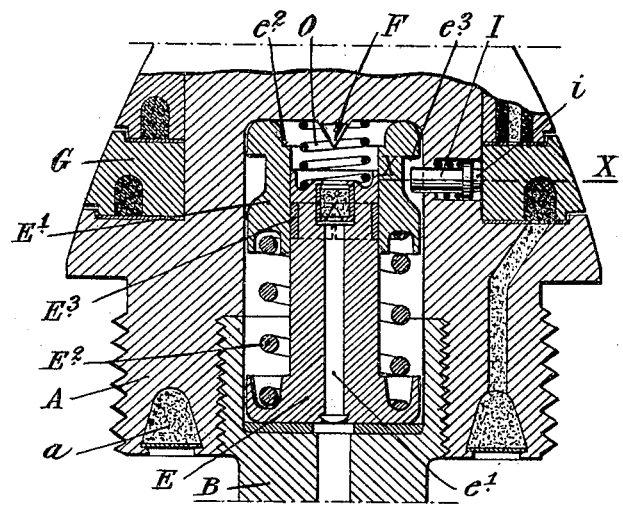

The element E constitutes the priming holder and the element E', which is able to slide on the element E, is normally held in the position shown in Fig. 5, by the action of a spring $E^2$; E' presents a shoulder $e^2$ the object of which is hereinafter described. When operating the fuse ring G by hand, the nose of a bolt I can be engaged in a groove $e^3$ in the element E' of the plunger.

Figure 7:
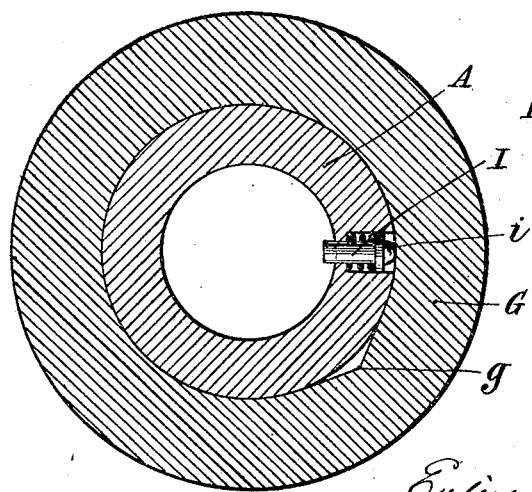

Referring to Figs. 6 and 7, which are sections on the line X—X in Fig. 5 with the bolt represented respectively in the disengaged position and in the engaged position, the engagement of the bolt I with the element E' is effected by the action of a double incline $g$ on the movable ring G upon a nipple $i$ arranged on the rear of the said bolt.

When the projectile is arranged to act as common shell, the bolt I occupies the disengaged position shown in Figs. 6 and 8. When the projectile is fired the element E' of the plunger lags behind owing to its inertia and occupies the position indicated in Fig. 8. A split ring $E^3$ on the element E of the plunger opens as soon as the shoulder $e^2$ on the element E' has passed beyond the lower edge thereof. The element E' is thus retained upon the element E in the relative position shown in Fig. 8. The plunger therefore acts as if it were formed of two integral elements E and E'.

When the projectile is arranged to act as shrapnel, the bolt I is engaged in the groove $e^3$, as shown in Figs. 5 and 7, by suitably adjusting the ring G. The plunger then acts as if it were reduced to the weight of the element E. When the shrapnel bursts, this weight is insufficient to cause the accidentally displaced plunger to overcome the action of the springs O and $E^2$, and the action of the said springs can only be overcome by the inertia of the plunger when the projectile is stopped by striking against an obstacle or body in its path.

Figure 9:
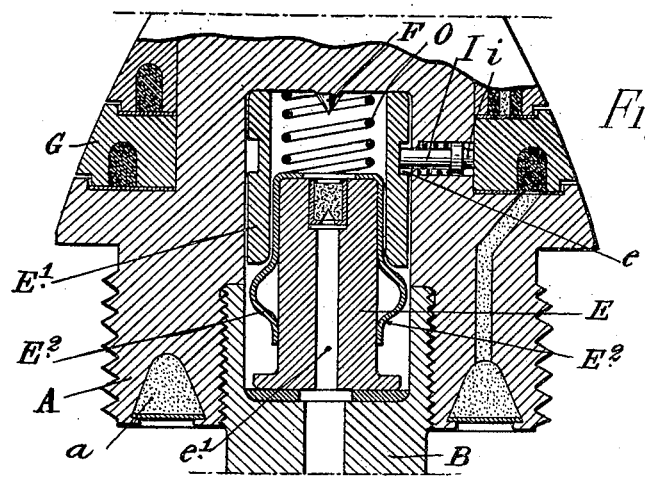

Referring to Fig. 9, which illustrates a modification of the aforementioned construction in sectional elevation, the element E' of the bipart plunger instead of bearing upon a spiral spring and engaging behind a split ring, bears upon protuberances formed on a clip spring $E^2$ embracing the element E of the plunger.

Figure 10:
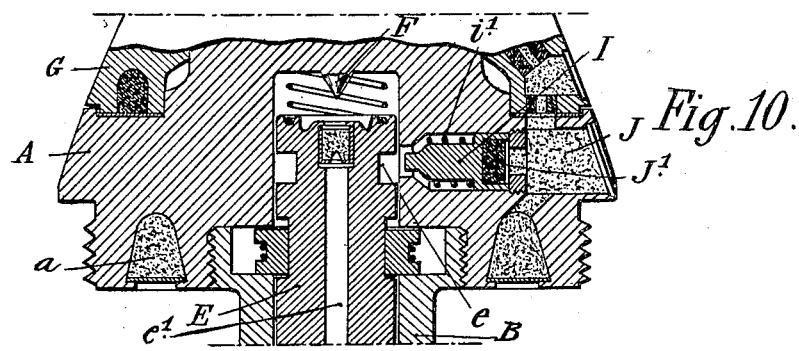

In the construction illustrated in Fig. 10, a bolt I, which is normally disengaged from the plunger E by the action of a spring $i'$, is engaged by its nose in a groove $e$ on said plunger under the influence of the gases evolved by the combustion of the fuse composition J. At its rear, the bolt comprises a housing containing a block of compressed powder J'. So long as this block burns the pressure of the resulting gases is sufficient to overcome the action of the counter spring $i'$ but when the block is consumed, which does not occur until the projectile has traveled a suitable distance from the bursting point of the shrapnel, the bolt is disengaged by the spring $i'$ and the percussion system E—F is then able to act under the influence of the shock of the fuse striking against an obstacle.

Figure 11:
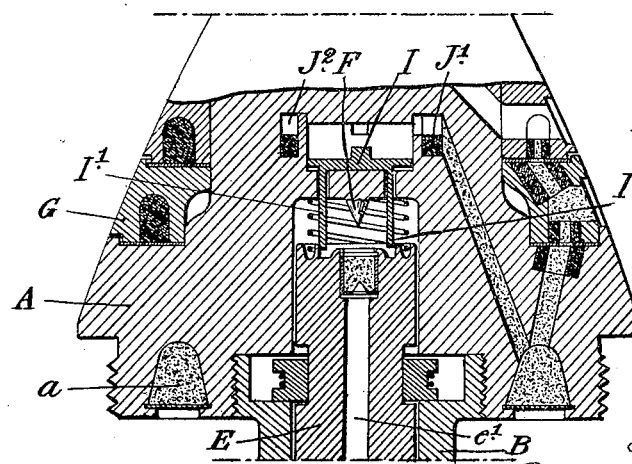

Fig. 11 illustrates an embodiment of the invention in which, when the projectile is set to act as shrapnel, the temporary braking of the plunger E is obtained automatically when the projectile is discharged.

Two arms I', integral with a disk I, form a stop so long as the pressure of the gases from a fuse composition J' housed in an annular space $J^2$ and ignited by the flame transmitted to the rear charge acts upon the disk I.

In the construction illustrated in Fig. 12, the locking device is constituted by a bolt I which is provided with a collar $i$ and is movable in a chamber J filled with powder. The charge of powder in the chamber J is located in the path of the flame coming from the firing mechanism C—D (Fig. 1). The nose of the bolt is arranged opposite a groove $e$ in the plunger E.

Normally, the nose of the bolt I is maintained inoperative in a conical ring of soft metal K. A spring L maintains the plunger in such a manner that the groove $e$ therein remains opposite the nose of the bolt.

When after firing, the flame is transmitted to the rear charge of the shrapnel, the charge of powder in the chamber J is kindled. The bolt I is then expelled by the gas pressure and crushes the ring K so that its nose engages in the groove $e$ and securely retains the plunger E. The bolt thus prevents the striking mechanism E—F from acting and thereby disturbing the normal operation of the shrapnel. As, however, the mechanism E—F remains inoperative when the projectile strikes the ground or some other obstacle, and is unable at this moment to explode the detonator B, Fig. 1, the explosion of the detonator is insured by the following means. The flame transmission passages $e'$ of the plunger E communicate through perforations $e^4$ with the passage M formed at the bottom of a chamber arranged in the path of the flame proceeding to the rear charge of the shrapnel, and in which a retarding composition N is provided, the duration of the combustion of this composition being determined in such a manner that it is not consumed until after the fuse has reached an appropriate distance from the bursting point of the shrapnel.

Figs. 13, 14 and 15 illustrate two modifications of this automatic locking device combined with a retarded flame transmission for insuring the explosion of the detonator.

In the construction illustrated in Fig. 13, the bolt I is constituted by a socket which, being forced into the groove $e$ in the plunger E under the influence of the gas pressure, simultaneously becomes expanded and is thereby wedged in the said groove, thus preventing its inopportune return to the disengaged position.

In the construction illustrated in Figs. 14 and 15 the locking bolt is constituted by a socket I. Springs I' are interposed between this socket and a piston I² upon which the gases of the ignited charge act. In the locked position represented by the partial detail section in Fig. 15, the extremities of the springs I' engage in a groove A' formed in the body of the fuse.

Figure 16:
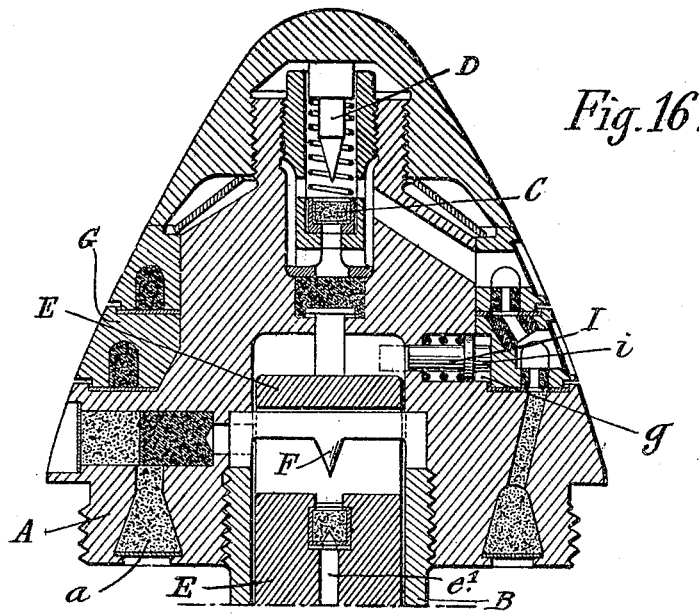

Fig. 16 is a sectional elevation of an embodiment of the invention in which a hand locking device is combined with a retarded flame transmission for insuring the explosion of the detonator.

In this construction the plunger E is locked by hand before the projectile is used. With this object in view, as in the example illustrated in Figs. 5 to 8, a bolt I is normally engaged by its tail-piece $i$ in a recess $g$ in the movable fuse ring G. When this ring is caused to rotate for regulating the fuse, the bolt I is expelled and assumes the locking position indicated in broken lines in the drawing.

Figure 17:
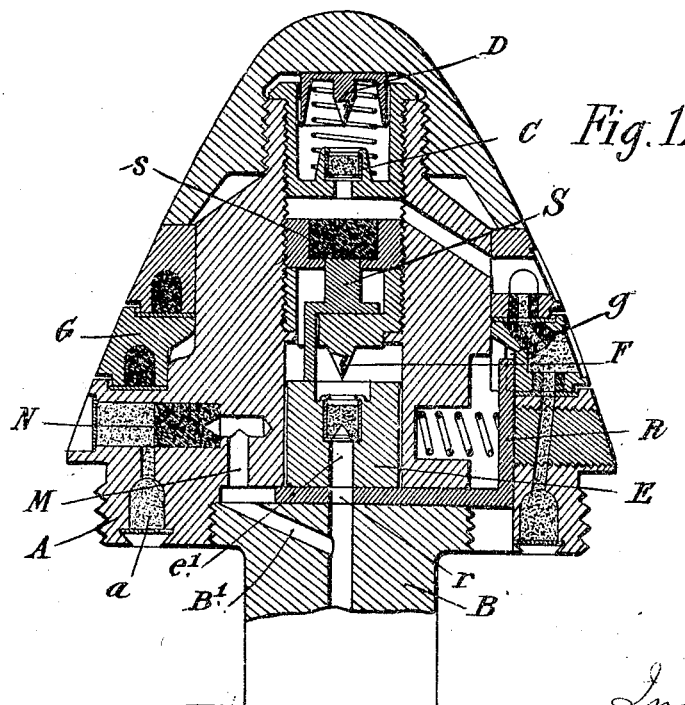
Figs. 17 and 18 illustrate two embodiments of the invention in which a screen is interposed between the percussion firing mechanism and the detonator.

In the construction illustrated in Fig. 17 an inclined surface $g$ on the fuse ring G serves to shift a sliding screen R toward the left. Accordingly, when the fuse is adjusted for the projectile to act as shrapnel the communication aperture $r$ provided in this screen, ceases to register with the passage $e'$ and the flame can no longer pass between the said passage $e'$ of the plunger and the axial passage of the detonator B. A member S maintained in a manner already known by a compressed powder block $s$ prevents the operation of the percussion mechanism E—F during transportation. The block $s$ ignited by the mechanism C—D burns as soon as firing is effected and places the mechanism E—F in normal operative condition. At a suitable distance from the bursting point of the shrapnel, the compressed block N is consumed and the flame is transmitted through the passage M and B' to the detonator B to explode the same.

Figure 18:
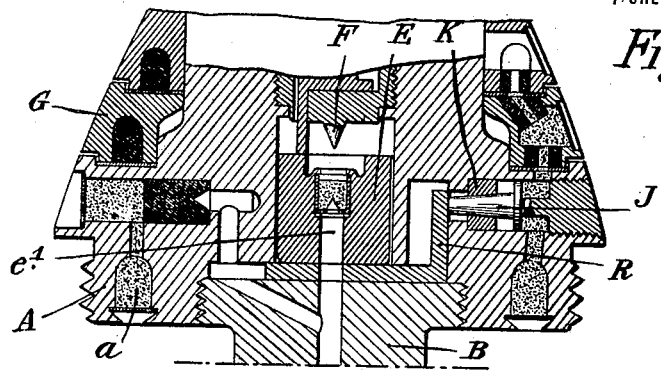

Instead of the screen B being displaced by hand by means of an inclined face on the fuse ring G, when the fuse is adjusted, it might be automatically caused to assume the position in which it shuts off the mechanism E—F from the detonator as shown in the modification illustrated in Fig. 18. This may be effected by employing an automatic locking mechanism similar to that described with reference to Fig. 12. A piston J is expelled by the gases produced by the transmission of the flame toward the rear charge of the shrapnel and becomes wedged in a ring of soft metal K.

Figure 19:
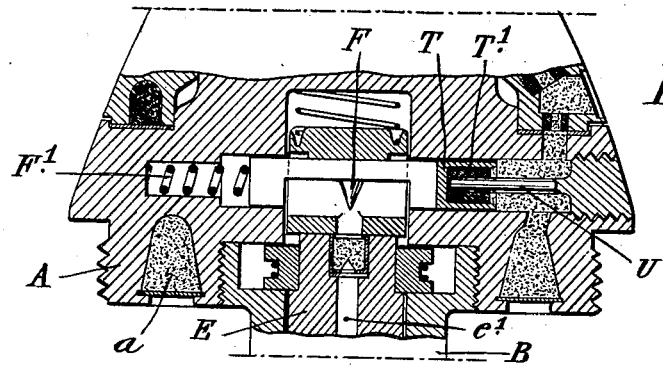
Figs. 19 and 20 illustrate two embodiments of the invention in which premature ignition of the detonator is prevented by a relative displacement of the striker and plunger.

In Figs. 19 and 20 premature ignition of the detonator is prevented by a temporary or permanent relative displacement of the striker and the plunger of the percussion mechanism E.

Referring to Fig. 19 the pin F of the percussion firing mechanism is carried by a block which is capable of displacement transversely relatively to the plunger E. This block is subjected on one side to the action of a spring F', while on the other side it bears against a socket T normally held in the position illustrated by a compressed powder filling T'. When the projectile is fired the flame produced by the mechanism C—D in passing to the rear charge, ignites the block T'; the socket T then forces the striker holder toward the left against the action of the spring F'. When the block is consumed which only takes place at a suitable distance from the bursting point of the shrapnel, the action of the spring F' again preponderates, and returns the striker to its original position; a rod U, normally engaged in the block T', forms a stop and limits the return movement of the socket T and striker F.

In the construction shown in Fig. 20, the pin F, before firing, is held by a stop Y which is itself retained by a powder block Y' housed in the ring Y². The fuse firing mechanism C—D is itself rendered inoperative by a forked pin D'—D' of known construction. When the parts are arranged in the manner indicated in the drawing the fuse is adjusted for the projectile to act as common shell. On firing, the mechanism C—D does not act, the block of powder Y' is not kindled and the members E—F of the firing mechanism remain in the relative positions shown in the drawing. When the projectile strikes an obstacle the pin F is within operative reach of the plunger E which moves and strikes the same owing to its inertia.

If it is desired to cause the projectile to act as shrapnel the forked pin D'—D' is withdrawn. Then on firing the mechanism C—D acts and transmits the flame to the rear charge of the shrapnel and ignites the powder block Y'. As the pin F is no longer held it is brought forward by the spring V out of the operative range of movement of the plunger E, the forward travel of which is limited by shoulders W on the fuse body. The explosion of the detonator at an appropriate distance from the bursting point of the shrapnel is insured by means of a retarded flame transmission N such as described in the preceding arrangements.

What I claim and desire to secure by Letters Patent of the United States is:—

1. A double-acting fuse for projectiles, comprising a timed firing mechanism for igniting one charge of the projectile, a second percussion firing member for igniting another charge of the projectile, means for interfering with the normal operation of the second firing mechanism, and means operated by the gases produced by ignition of the first firing mechanism for releasing the said last-named means.

2. A double-acting fuse for projectiles, comprising a timed firing mechanism for igniting one charge of the projectile, a second firing mechanism for igniting another charge of the projectile, means for interfering with the normal operation of the second firing mechanism, and a restraining means therefor comprising a bolt adapted to be operated by the gases produced by the ignition of the first firing mechanism.

3. A double-acting fuse for projectiles, comprising a timed firing mechanism for igniting one charge of the projectile, a second firing mechanism for igniting another charge of the projectile, means for interfering with the normal operation of the second firing mechanism comprising a spring-pressed ring, and a restraining means therefor comprising a bolt adapted to be operated by the gases produced by the ignition of the first firing mechanism.

4. A double-acting fuse for projectiles, comprising a timed firing mechanism for igniting one charge of the projectile, a second firing mechanism for igniting another charge of the projectile and comprising a longitudinally movable plunger, a device adapted to be moved longitudinally of the plunger to restrict the movement thereof, and means for holding the said device inoperative.

5. A double-acting fuse for projectiles, comprising a timed firing mechanism for igniting one charge of the projectile, optionally adjustable means for causing the said firing mechanism to be inoperative, a second percussion firing mechanism for igniting another charge of the projectile, and a spring for resisting the action of the second firing mechanism, the said spring being normally inoperative when the first said firing mechanism is inoperative.

6. A double-acting fuse for projectiles, comprising a timed firing mechanism for igniting one charge of the projectile, a second percussion firing mechanism for igniting another charge of the projectile, a spring for resisting the action of the second firing mechanism, and movable means adapted when in one position to hold the spring inoperative.

7. A double-acting fuse for projectiles, comprising a timed firing mechanism for igniting one charge of the projectile, optionally adjustable means for causing the said firing mechanism to be inoperative, a second percussion firing mechanism for igniting another charge of the projectile, a spring for resisting the action of the second firing mechanism, and means for holding the spring inoperative when the first said firing mechanism is inoperative.

8. A double-acting fuse for projectiles, comprising a timed firing mechanism for igniting one charge of the projectile, a second firing mechanism for igniting another charge of the projectile and comprising a longitudinally movable plunger, a spring-pressed device concentric with the plunger and movable longitudinally into plunger-restraining position independently of the plunger, and means for releasing the device upon ignition of the first firing mechanism.

9. A double-acting fuse for projectiles, comprising a timed firing mechanism for igniting one charge of the projectile, a second firing mechanism for igniting another charge of the projectile and comprising a longitudinally movable plunger, a device opposed to said plunger, a spring for projecting said device into a position to resist movement of the plunger and a detent for said device automatically actuated to release the same upon ignition of the first firing mechanism.

10. A double-acting fuse for projectiles, comprising a timed firing mechanism for igniting one charge of the projectile, a second firing mechanism for igniting another charge of the projectile and comprising a longitudinally movable plunger, a spring-pressed device concentric with the plunger and movable longitudinally into plunger-restraining position independently of the plunger, and means for releasing said device comprising a bolt actuated by the gases produced by the ignition of the first firing mechanism.

11. A double-acting fuse for projectiles, comprising a timed firing mechanism for igniting one charge of the projectile, a second percussion firing mechanism for igniting another charge of the projectile, normally inoperative means for interfering with the action of the second firing mechanism, and means automatically acting to cause the interfering device to become operative when the first said firing mechanism is operated.

In testimony whereof I have signed this specification in the presence of two subscribing witnesses.

EUGÈNE SCHNEIDER.

Witnesses:
R. DE LEVELINGE,
CHAS. P. PRESSLY.